United States Patent [19]

Koyama et al.

[11] Patent Number: 4,914,678
[45] Date of Patent: Apr. 3, 1990

[54] REACTOR CORE IN A NUCLEAR REACTOR AND INITIAL CORE IN A NUCLEAR REACTOR

[75] Inventors: Junichi Koyama, Hitachi; Motoo Aoyama, Mito, both of Japan

[73] Assignee: Hitachi, Ltd., Tokyo, Japan

[21] Appl. No.: 230,171

[22] Filed: Aug. 9, 1988

[30] Foreign Application Priority Data

Aug. 12, 1987 [JP] Japan ................................ 62-199773

[51] Int. Cl.$^4$ .............................................. G21C 1/00
[52] U.S. Cl. ...................................... 376/267; 376/435
[58] Field of Search ............... 376/267, 435, 428, 171, 376/172, 173, 214, 349

[56] References Cited

U.S. PATENT DOCUMENTS 3,660,227 5/1972 Ackroyd et al. ...................... 376/173
4,229,258 10/1980 Takeda et al. ........................ 376/435
4,244,784 1/1981 Takeda et al. ........................ 376/435

FOREIGN PATENT DOCUMENTS 55-31436 8/1980 Japan .
0179391 10/1983 Japan .

*Primary Examiner*—Daniel Wasil
*Attorney, Agent, or Firm*—Antonelli, Terry & Wands

[57] ABSTRACT

The reactor core is divided into a central region and a surrounding outer region in the radial direction. First fresh fuel unirradiated assemblies newly loaded onto the outer region contain a fissible material in amounts less than that of the fissible material of second fresh unirradiated fuel assemblies newly loaded onto the central region. If the amount of the fissible material in the upper region of the first fuel assembly is denoted by a, the amount of the fissible material in the lower region of the first fuel assembly by b, the amount of the fissible material in the upper region of the second fuel assembly by c, and the amount of the fissible material in the lower region of the second fuel assembly by d, then a relationship $a/b < c/d$ is satisfied. The reactor core provides sufficient thermal margin and improved cold shutdown margin.

23 Claims, 8 Drawing Sheets

| | | EMBODIMENT 1 | | EMBODIMENT 2 | | EMBODIMENT 3 | | EMBODIMENT 4 | |
|---|---|---|---|---|---|---|---|---|---|
| | | CENTER REGION | OUTSIDE REGION | CENTER REGION | OUTSIDE REGION | CENTER REGION | OUTSIDE REGION | CENTER REGION | OUTSIDE REGION |
| ENRICHMENT | UPPER REGION | 4.52 | 4.46 | 4.53 | 4.43 | 4.52 | 4.42 | 4.53 | 4.46 |
| | LOWER REGION | 4.42 | 4.46 | 4.43 | 4.43 | 4.42 | 4.47 | 4.43 | 4.40 |
| EFFECTIVE MULTIPLICATION FACTOR | | +0.0% | | +0.0% | | +0.005% | | — | |
| COLD SHUTDOWN MARGIN (%ΔK) | | +0.78 | | +0.78 | | +0.78 | | — | |
| MAXIMUM LINEAR HEAT RATING (KW/ft) | | −0.01 | | −0.01 | | +0.0 | | — | |

|  |  | EMBODIMENT 1 | | EMBODIMENT 2 | | EMBODIMENT 3 | | EMBODIMENT 4 | |
|---|---|---|---|---|---|---|---|---|---|
|  |  | CENTER REGION | OUTSIDE REGION | CENTER REGION | OUTSIDE REGION | CENTER REGION | OUTSIDE REGION | CENTER REGION | OUTSIDE REGION |
| ENRICHMENT | UPPER REGION | 4.52 | 4.46 | 4.53 | 4.43 | 4.52 | 4.42 | 4.53 | 4.46 |
|  | LOWER REGION | 4.42 | 4.46 | 4.43 | 4.43 | 4.42 | 4.47 | 4.43 | 4.40 |
| EFFECTIVE MULTIPLICATION FACTOR | | +0.0% | | +0.0% | | +0.005% | | — | |
| COLD SHUTDOWN MARGIN (%ΔK) | | +0.78 | | +0.78 | | +0.78 | | — | |
| MAXIMUM LINEAR HEAT RATING (kW/ft) | | −0.01 | | −0.01 | | +0.0 | | — | |

FIG. 9

|  |  | REFERENCE CORE | |
|---|---|---|---|
|  |  | CENTER REGION | OUTSIDE REGION |
| ENRICHMENT | UPPER REGION | 4.52 | 4.52 |
|  | LOWER REGION | 4.42 | 4.52 |
| EFFECTIVE MULTIPLICATION FACTOR (Keff) | | 1.000 | |
| COLD SHUTDOWN MARGIN (%ΔK) | | 1.7 | |
| MAXIMUM LINEAR HEAT RATING (kW/ft) | | 12.1 | |

REACTOR CORE IN A NUCLEAR REACTOR AND INITIAL CORE IN A NUCLEAR REACTOR

BACKGROUND OF THE INVENTION

The present invention relates to a reactor core in a nuclear reactor and to an initial core in a nuclear reactor. More specifically, the invention relates to a reactor core in a nuclear reactor and to an initial core in a nuclear reactor, that are adapted to a boiling water reactor.

The boiling water reactor has a core which is constituted by many fuel assemblies arranged in the form of a lattice. The cooling water that works both as a coolant and a neutron moderator flows into the core from the lower end of the core, heated and is vaporized as it ascends through the fuel assemblies. The cooling water inclusive of the vapor flows out from the upper end of the core. In such a core, the void fraction becomes high toward the upper region of the core, and the power distribution in the axial direction swells downwards. There has been proposed in U.S. Pat. No. 4,229,258 a fuel assembly which is capable of flattening the power distribution in the axial direction. It needs not be pointed out that the core constituted by the fuel assembly exhibits power distribution that is markedly flattened in the axial direction.

Another condition which is important in operating the nuclear reactor includes cold shutdown margin in addition to flattening the power distribution in the axial direction. Technology for improving the cold shutdown margin has been proposed in Japanese Patent Laid-Open No. 179,391/1983 (U.S. patent application Ser. No. 360,390 filed on March 22, 1982), according to which there is disclosed a fuel assembly wherein the enrichment at the upper end thereof in the axial direction in which a peak reactivity takes place is lowered during the cold shutdown of the nuclear reactor. The cold shutdown margin corresponds to shutdown margin discussed in Japanese Patent Laid-Open No. 179,391/1983 (page 3, lower right column, lines 9–16). In the fuel assembly disclosed in Japanese Patent Laid-Open No. 179,391/1983, an average enrichment in the upper region is greater than that of the lower region like in the fuel assembly taught in U.S. Pat. No. 4,229,258).

SUMMARY OF THE INVENTION

A first object of the present invention is to provide a reactor core in a nuclear reactor and an initial core in a nuclear reactor, that are capable of offering sufficient thermal margin and that further help improve the cold shutdown margin.

A second object of the present invention is to provide a reactor core in a nuclear reactor and an initial core in a nuclear reactor, that are capable of enhancing thermal margin in addition to the first object.

A third object of the present invention is to provide a reactor core in a nuclear reactor and an initial core in a nuclear reactor, that are simple in construction in addition to the first object.

To realize the first object, a first feature of the present invention resides in a reactor core in a nuclear reactor wherein a region in the radial direction of the core is divided into a central region and an outer region in the radial direction except the outermost circumferential region occupied by fuel assemblies arranged along the outermost circumference which forms part of the region in the radial direction of the core, amount of a fissible material contained in first fuel assemblies that are newly loaded onto the outer region are smaller than amount of the fissible material contained in second fuel assemblies that are newly loaded onto the central region, and a relationship $a/b < c/d$ is satisfied, wherein a denotes the amount of the fissible material in the upper region of the first fuel assemblies, b denotes the amount of the fissible material in the lower region of the first fuel assemblies, c denotes the amount of the fissible material in the upper region of the second fuel assemblies, and d denotes the amount of the fissible material in the lower region of the second fuel assemblies.

To realize the first object, a second feature of the present invention resides in an initial core in a nuclear reactor wherein a region in the radial direction of the core is divided into a central region and an outer region in the radial direction except the outermost circumferential region occupied by fuel assemblies arranged along the outermost circumference which forms part of the region in the radial direction of the core, an average enrichment in the outer region is smaller than an average enrichment in the central region, and a relationship $a/b < c/d$ is satisfied, wherein a denotes an average enrichment in the upper region of the outer region, b denotes an average enrichment in the lower region of the outer region, c denotes an average enrichment in the upper region of the central region, and d denotes an average enrichment in the lower region of the central region.

To realize the second object, a third feature of the present invention resides in a reactor core in a nuclear reactor wherein a region in the radial direction of the core is divided into a central region and an outer region in the radial direction except the outermost circumferential region occupied by fuel assemblies arranged along the outermost circumference which forms part of the region in the radial direction of the core, amounts of a fissible material contained in first fuel assemblies that are newly loaded onto the outer region are smaller than amounts of the fissible material contained in second fuel assemblies that are newly loaded onto said central region, a difference between an amount a of the fissible material in the upper region of the first fuel assemblies and an amount b of the fissible material in the lower region of the first fuel assemblies is smaller than a difference between an amount c of the fissible material in the upper region of the second fuel assembly and an amount d of the fissible material in the lower region of the second fuel assembly, the amount a of the fissible material is greater than the amount b of the fissible material, and the amount c of the fissible material is greater than the amount d of the fissible material.

To realize the second object, a fourth feature of the present invention resides in an initial core in a nuclear reactor wherein a region in the radial direction of the core is divided into a central region and an outer region in the radial direction except the outermost circumferential region occupied by fuel assemblies arranged along the outermost circumference which forms part of the region in the radial direction of the core, an average enrichment in the outer region is smaller than an average enrichment in the central region, a difference between an average enrichment a in the upper region of the outer region and an average enrichment b in the lower region of the outer region is smaller than a difference between an average enrichment c in the upper region of the central region and an average enrichment d in the lower region of the central region, the average enrichment a is greater than the average enrichment b, and the average enrichment c is greater than the average enrichment d.

To realize the third object, a fifth feature of the present invention resides in a reactor core in a nuclear reactor wherein a region in the radial direction of the core is divided into a central region and an outer region in the radial direction except the outermost circumferential region occupied by fuel assemblies arranged along the outermost circumference which forms part of the region in the radial direction of the core, amounts of a fissible material contained in first fuel assemblies that are newly loaded onto the outer region are smaller than amounts of the fissible material contained in second fuel assemblies that are newly loaded onto the central region, the amount of the fissible material of the first fuel assemblies is uniformly distributed in the axial direction in at least the region that excludes the upper end portion and the lower end portion thereof, and an amount c of the fissible material in the upper region of the second fuel assembly is greater than an amount d of the fissible material in the lower region of the second fuel assembly.

To realize the third object, a sixth feature of the present invention resides in an initial core in a nuclear reactor wherein a region in the radial direction of the core is divided into a central region and an outer region in the radial direction except the outermost circumferential region occupied by fuel assemblies arranged along the outermost circumference which forms part of the region in the radial direction of the core, an average enrichment in the outer region is smaller than an average enrichment in the central region, an average enrichment on lateral cross section of the outer region is uniformly distributed in the axial direction in at least a region that excludes the upper end portion and the lower end portion, and an average enrichment c in the upper region of the central region is greater than an average enrichment d in the lower region of the central region.

According to the first feature of the present invention, amounts of the fissible material contained in the first fresh unirradiated fuel assemblies that are newly loaded onto the outer region are smaller than amounts of the fissible material contained in the second fresh unirradiated fuel assemblies that are newly loaded onto the central region, and whereby it is made possible to improve the cold shutdown margin in the outer region in the radial direction of the reactor core. Further, a condition a/b<c/d is satisfied wherein a denotes the amount of the fissible material in the upper region of the first fuel assembly, b denotes the amount of the fissible material in the lower region of the first fuel assembly, c denotes the amount of the fissible material in the upper region of the second fuel assembly, and d denotes the amount of the fissible material in the lower region of the second fuel assembly. Therefore, a sufficient thermal margin is obtained in the central region, and an improved cold shutdown margin is obtained in the outer region. Namely, there is provided a reactor core in a nuclear reactor which offers improved cold shutdown margin.

According to the second feature of the present invention, there is obtained an initial core for a nuclear reactor which offers sufficiently large thermal margin and improved cold shutdown margin owing to the function same as that of the first feature.

In the reactor core of the nuclear reactor having the third feature of the present invention, the amount a of the fissible material is greater than the amount b of the fissible material, and the amount c of the fissible material is greater than the amount d of the fissible material. Therefore, the amount of the fissible material in the lower region does not become greater than the amount of the fissible material in the upper region both in the central region and in the outer region, and the thermal margin in the core is improved compared with that of the first feature.

The initial core in the nuclear reactor having the fourth feature of the present invention exhibits improved thermal margin owing to the function same as that of the third feature.

According to the reactor core in the nuclear reactor having the fifth feature of the present invention, the amount of the fissible material in the first fuel assembly is uniformly distributed in the axial direction in at least a region that excludes the upper end portion and the lower end portion. Therefore, the constitution of the first fuel assembly can be simplified and the constitution of the core can be simplified, too.

According to the initial core in the nuclear reactor having the sixth feature of the present invention, the constitution of the core can be simplified owing to the function same as that of the fifth feature.

DETAILED DESCRIPTION OF THE PREFERRED EMBODIMENTS

Technology taught in Japanese Patent Laid-Open No. 179,391/1983 is to improve cold shutdown margin in the axial direction. The present inventors, however, have discovered the fact that the cold shutdown margin varies depending upon the position in the radial direction of the core when the core of the boiling water reactor which features a high burn-up (greater than a conventional burn-up of about 30 GWd/t) of the fuel assembly is constituted by the fuel assemblies disclosed in Japanese Patent Laid-Open No. 179,391/1983. That is, if the central region of the core is compared with the circumferential region of the core in the radial direction of the core excluding the outermost circumference, the cold shutdown margin in the latter region is smaller than that of the former region. Therefore, the cold shutdown margin of the core must be discussed by giving attention to not only the axial direction of the core but also to the radial direction of the core.

That is, the present invention was accomplished based upon the study of reactor core characteristics of a high burn-up (greater than the conventional burn-up of about 30 GWd/t) obtained by increasing the burn-up of the fuel assemblies. Results of the study will now be described in detail.

Figure 1:
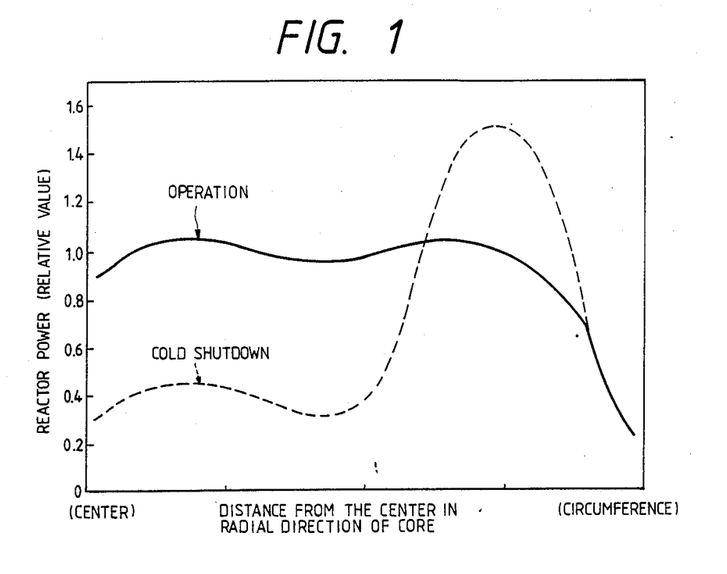
FIG. 1 is a diagram illustrating the power distributions in the radial direction of the core during the operation and the cold shutdown of the nuclear reactor.

FIG. 1 illustrates the power distribution of the core in the radial direction during the operation (solid line) and the cold shutdown (broken line) of the nuclear reactor. These characteristics apply for the core on which the below-mentioned fuel assembly is loaded. That is, the fuel assembly comprises a first region that extends from the lower end of the effective fuel length (region where fuel pellets are charged in the fuel assembly) to 1/24 of the full length of the effective fuel length filled with natural uranium, a second region that extends from the upper end of the first region to 11/24 of the full length of the effective fuel length filled with uranium dioxide of 4.42% by weight of enrichment, a third region that extends from the upper end of the second region to 22/24 of the full length of the effective fuel length filled with uranium dioxide of 4.52% by weight of enrichment, and a fourth region that extends from the upper end of the third region to the upper end of the effective fuel length filled with natural uranium. The power distribution (relative power distribution) is generally flat in the radial direction of the core during the operation of the nuclear reactor in which the enrichments in the second and third regions are uniform in the axial direction. During the cold shutdown in which the nuclear reactor is not in operation, however, the power distribution (relative power distribution) of the core in the radial direction is low in the central region of the core and is extremely high in the circumferential region of the core. This is due to the fact that since neutrons escape from the peripheral portion in the radial direction of the core at a large probability and the fissible material (e.g., uranium-235) is consumed in the circumferential region in amounts relatively smaller than that consumed in the central region, the circumferential region exhibits a relatively large reactivity. Therefore, the cold shutdown margin in the radial direction of the core becomes the smallest in the circumferential region where the reactivity increases when the control rods are withdrawin during the cold shutdown.

Figure 2:
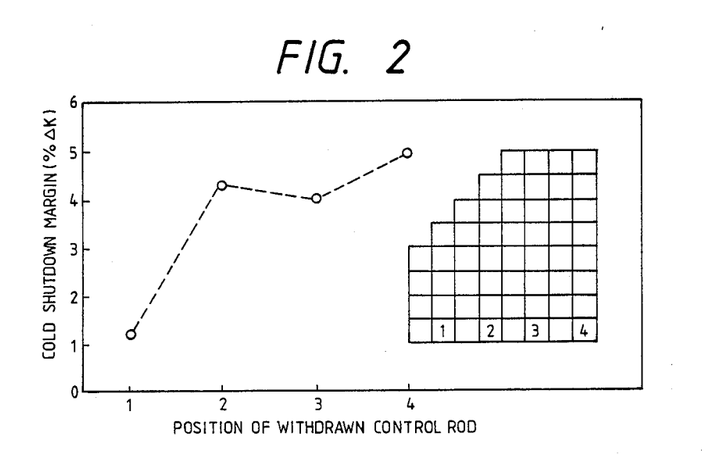
FIG. 2 is a diagram showing a relationship between the positions of withdrawn control rods and the cold shutdown margin.

The fact that the cold shutdown margin in the radial direction of the core becomes the smallest in the circumferential region will also be apparent from the characteristics of FIG. 2 which illustrates a relationship between the positions of withdrawn control rods and the cold shutdown margin. In FIG. 2, A represents the simulation of a quarter of the core wherein numerals 1 to 4 indicate positions of the control rods that are withdrawn under the condition where the control rods have all been inserted completely. The cold shutdown margin is still sufficiently maintained even when the control rods (located at positions 2, 3 and 4) are withdrawn from the central region of the core. When the control rod (located at position 1) is withdrawn from the circumferential region of the core, however, the cold shutdown margin decreases to smaller than about one-third that of when the control rods are withdrawn from the positions 2, 3 and 4.

The same tendency of characteristics as those shown in FIGS. 1 and 2 are exhibited even when the fuel assemblies shown in Japanese Patent Laid-Open No. 179,391/1963 are used for constituting the core of a boiling water reactor of a high burn-up which increases the burn-up of the fuel assemblies.

Figure 3:
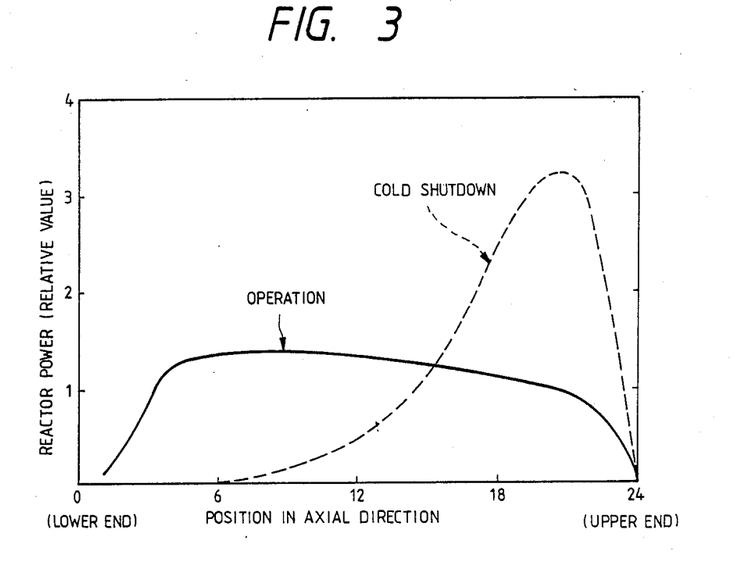
FIG. 3 is a diagram showing the power distribution in the axial direction of the core during the operation and the cold shutdown of the nuclear reactor.

FIG. 3 illustrates the power distributions (relative power distributions) in the axial direction of the core during the operation (solid line) and cold shutdown (broken line) of the nuclear reactor. The characteristics apply for the central region in the core from where characteristics of FIG. 1 were found. The power distribution in the axial direction during the operation of the nuclear reactor is nearly uniform though a peak is exhibited in the lower region of the core. During the cold shutdown of the nuclear reactor, however, the power distribution rises greatly since there exist no voids in the upper region of the core. Therefore, the cold shutdown margin deteriorates in the upper region of the core. This tendency is exhibited even in the outer region of the core in the radial direction. When fuel assemblies taught in Japanese Patent Laid-Open No. 179,391/1963 are used, the cold shutdown margin in the upper region of the core during the cold shutdown is more improved than that of FIG. 3 since the enrichment is decreased in the upper end region.

Consideration related to the cold shutdown margin of the core in the radial direction gave the present inventors a clue to the discovery that the improvement can be accomplished if the average enrichment (or content of a fissible material) in the outer region of the core in the radial direction is set to be smaller than the average enrichment (or content of the fissible material) in the central region of the core in the radial direction.

Figure 4A:
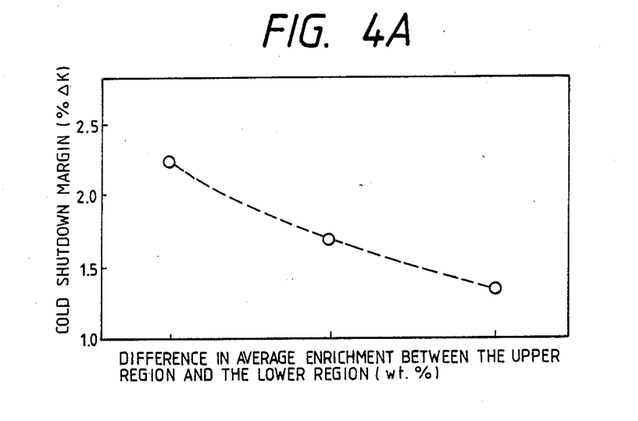
FIG. 4A is a diagram showing a relationship between the cold shutdown margin and the difference in average enrichment between the upper region and the lower region of the fuel assembly.
Figure 4B:
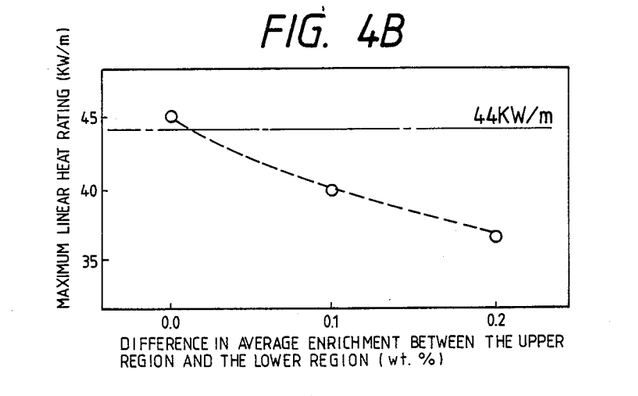
FIG. 4B is a diagram showing a relationship between a maximum linear heat rating and the difference in average enrichment between the upper region and the lower region of the fuel assembly.

It is also important to decrease a maximum linear heat rating of the fuel assembly from the standpoint of increasing the degree of freedom for controlling the operation of the nuclear reactor. The maximum linear heat rating can be decreased by loading onto the core a fuel assembly which has an average enrichment in the upper region that is higher than that of the lower region as taught in U.S. Pat. No. 4,229,258 and in Japanese Patent Laid-Open No. 179,391/1983. The inventors have studied the effects of enrichment distribution of the fuel assembly upon the cold shutdown margin and the maximum linear heat rating, and have obtained characteristics that are shown in FIGS. 4A and 4B. That is, the cold shutdown margin decreases with the increase in the difference in average enrichment between the upper region and the lower region of the fuel assembly, and becomes the greatest when the difference in average enrichment is zero. Difference in average enrichment develops between the upper region and the lower region of the fuel assembly due to the fact that the average enrichment in the upper region is greater than that of the lower region. In FIGS. 4A and 4B, the fuel assembly in which the difference of average enrichment is zero between the upper region and the lower region stands for the fuel assembly used for finding the characteristics of FIG. 1 and in which the enrichment is the same in the second and third regions, i.e., the enrichment is uniform in these regions in the axial direction. The fuel assembly further has first and fourth regions. Further, the fuel assembly in which the difference of average enrichment is greater than zero between the upper region and the lower region stands for the fuel assembly which has first, second, third and fourth regions like the fuel assembly used for finding the characteristics of FIG. 1, and in which the enrichment in the third region is greater than that of the second region, and the enrichment is uniform in the second and third regions in the axial direction. The cold shutdown margin increases by about 0.3% $\Delta k$ when the difference of average enrichment between the upper region and the lower region of the fuel assembly decreases by 0.1% by weight from 0.2% by weight to 0.1% by weight.

The maximum linear heat rating decreases with the increase in the difference of average enrichment between the upper region and the lower region of the fuel assembly, and is improved as shown in FIG. 4B. The maximum linear heat rating decreases by about 3 kw/m (1 kw/ft) when the difference of average enrichment between the upper region and the lower region increases by 0.1% by weight from 0.1% by weight to 0.2% by weight.

As described above, the cold shutdown margin and the maximum linear heat rating exhibit conflicting characteristics depending upon the difference in average enrichment between the upper region and the lower region of the fuel assembly.

Based upon new knowledge shown in FIGS. 1, 4A and 4B and characteristics of FIG. 3, the inventors have studied the structure of a core for a nuclear reactor that is capable of offering a sufficient thermal margin and improved cold shutdown margin, and have found the fact that the object can be achieved if the content of a fissible material contained in a first fuel assembly newly loaded onto the outer region of the core in the radial direction is set to be smaller than the amount of the fissible material contained in a second fuel assembly newly loaded onto the central region of the core in the radial direction, and if the difference in the content of fissible material between the upper region and the lower region of the first fuel assembly is set to be relatively smaller than the difference in the content of fissible material between the upper region and the lower region of the second fuel assembly (or concretely speaking, if the difference in the content of the fissible material between the upper region and the lower region of the first fuel assembly is set to lie on the left side in FIGS. 4A and 4B, and if the difference in the content of the fissible material between the upper region and the lower region of the second fuel assembly is set to lie on the right side in FIGS. 4A and 4B).

The present invention was accomplished based upon the above-mentioned study.

As will be obvious from the characteristics of FIG. 2, the outer region of the core in the radial direction should preferably be comprised of fuel assembly arrangements of first and second layers as counted from the outermost layer (outermost circumferential region) of the core. The outer region and the central region are specified excluding the outermost circumferential region because of the reason that the cold shutdown margin and thermal margin are not subjected to strict limitations in the outermost circumferential region and, in addition, the fuel assemblies that have burned sufficiently in the core are arranged along the outermost circumferential region.

Embodiments of the invention will now be described.

(Embodiment 1)

A preferred embodiment of the present invention adapted to a boiling water reactor will now be described in conjunction with FIGS. 5A, 5B, 6A, 6B, 7A and 7B.

Figure 5A:
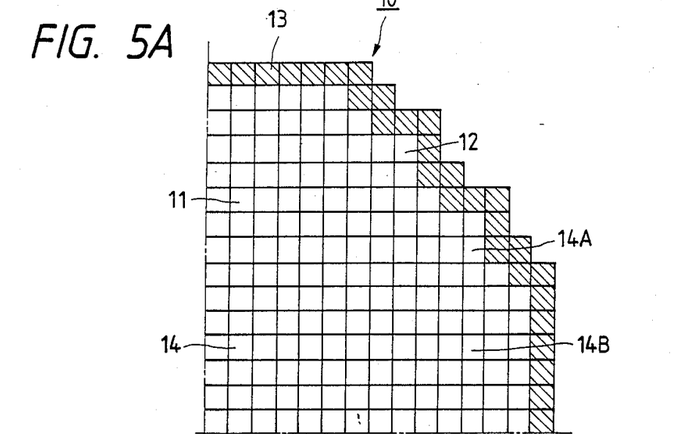
FIG. 5A is a section view illustrating a quarter of the core in a boiling water reactor according to an embodiment of the present invention.

A core 10 according to this embodiment is comprised of 764 fuel assemblies. FIG. 5A shows a quarter of the core. The core 10 consists of a central region 11, an outer region 12, and an outermost circumferential region 13 from the center toward the outside in the radial direction. The outer region 12 surrounds the central region 11, and the outermost circumferential region 13 surrounds the outside of the outer region 12. The outermost circumferential region 13 consists of a layer of fuel assemblies 14 arranged along the outermost side of the core 10. A boundary between the central region 11 and the outer region 12 is located between the third layer and the fourth layer from the outer periphery of the core 10.

The fuel assemblies 14 arranged in the central region 11 and the outer region 12 are replaced by one-third with new fuel assemblies (burn-up of 0 GW d/t) for every regular inspection of the nuclear reactor after every fuel cycle. The system in which the fuel assemblies in the core are replaced by one-third by new fuel assemblies is called three-batch system. In addition to the three-batch system, there has been proposed a fuel renewal system called four-batch system. According to this system, the fuel assemblies 14 arranged in the central region 11 and the outer region 12 are replaced by one-fourth by the new fuel assemblies 14 for every regular inspection of the nuclear reactor.

After a fuel cycle has been completed, operation of the nuclear reactor is stopped and one-third of the spent fuel assemblies are taken out from the core 10, and new fuel assemblies 14 having a burn-up of 0 GW d/t are loaded onto the positions from where the spent fuel assemblies are taken out.

Figure 6A:
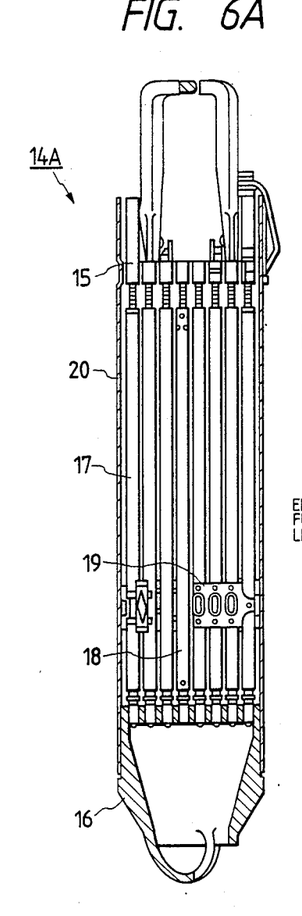
FIG. 6A is a vertical section view of a fuel assembly loaded onto the outer region of FIG. 5A.

Structure of the new fuel assembly 14A having the burn-up of 0 GW d/t that is loaded onto the outer region 12 at the time of replacing the fuel assemblies 14 will now be explained in conjunction with FIG. 6A. As shown in FIG. 6A, the fuel assembly 14A consists of an upper tie plate 15, a lower tie plate 16, a plurality of fuel rods 17, water rods 18, a fuel spacer 19 and a channel box 20. The fuel rods 17 and the water rods 18 are held at their both ends by the upper tie plate 15 and the lower tie plate 16. Though not diagrammed, the fuel rod 17 consists of many fuel pellets charged in a sealed cladding tube. The fuel pellets are obtained by compressing and sintering uranium dioxide. A gas plenum is formed in the cladding tube of the fuel rod 17 above the effective fuel length in which the fuel pellets are charged.

The fuel spacers 19 are arranged in a plural number in the axial direction of the fuel assembly 14A. The fuel spacers 19 are held by the water rods 18 to maintain a predetermined distance among the fuel rods 17. The channel box 20 surrounds the outsides of a bundle of fuel rods bundled by the fuel spacers 19, and is mounted on the upper tie plate 15.

Figure 6B:
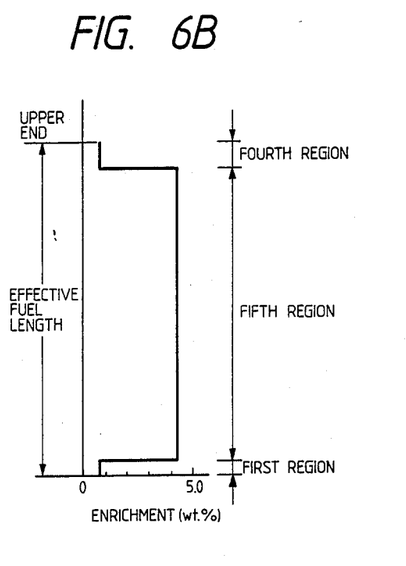
FIG. 6B is a diagram illustrating the enrichment distribution in the axial direction of the fuel assembly.

The fuel assembly 14A has an enrichment distribution in the axial direction as shown in FIG. 6B. That is, the fuel assembly 14A consists of natural uranium contained in a first region which extends from the lower end of the effective fuel length to 1/24 of the full length of the effective fuel length, uranium dioxide of an enrichment of 4.46% by weight contained in a fifth region that extends from the upper end of the first region to 22/24 of the full length of the effective fuel length, and natural uranium contained in a fourth region that extends from the upper end of the fifth region to the upper end of the effective fuel length. The enrichment (average enrichment on the lateral cross section of the fuel assembly 14A) in the fifth region is uniformly distributed in the axial direction.

Among the remaining two-thirds of the fuel assemblies 14 in the outer region 12 that were not replaced, one-half are the fuel assemblies 14A that have experienced the operation of nuclear reactor of one fuel cycle, and another one-half are the fuel assemblies 14A that have experienced the operation of nuclear reactor of two fuel cycles.

Figure 7A:
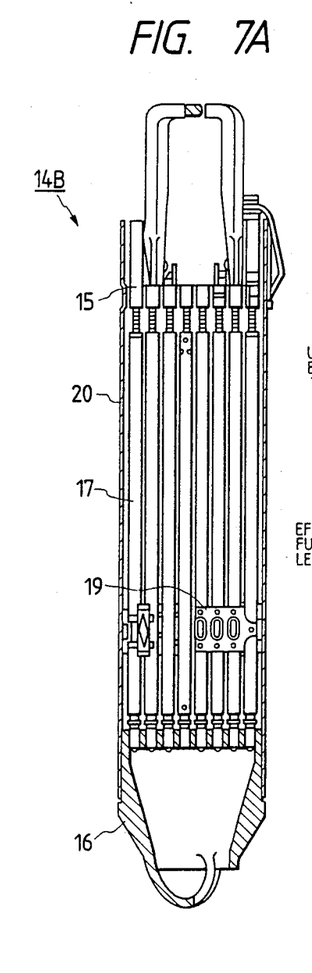
FIG. 7A is a vertical section view of the fuel assembly loaded onto the central region in FIG. 5A.
Figure 7B:
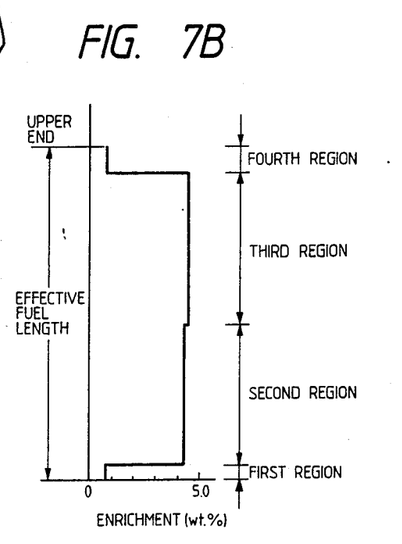
FIG. 7B is a diagram illustrating the enrichment distribution in the axial direction of the fuel assembly of FIG. 7A.

Structure of the new fuel assembly 14B having the turn-up of 0 GW d/t that is loaded onto the central region 11 at the time of replacing the fuel assemblies 14 will now be described in conjunction with FIG. 7A. The fuel assembly 14B has the same constitution as the fuel assembly 14A, and has an enrichment distribution in the axial direction as shown in FIG. 7B. That is, the fuel assembly 14B consists of natural uranium contained in a first region that extends from the lower end of the effective fuel length to 1/24 of the full length of the effective fuel length, uranium dioxide having an enrichment of 4.42% by weight contained in a second region that extends from the upper end of the first region to 11/24 of the full length of the effective fuel length, uranium dioxide of an enrichment of 4.52% by weight contained in a third region that extends from the upper end of the second region to 22/24 of the full length of the effective fuel length, and natural uranium contained in a fourth region that extends from the upper end of the third region to the upper end of the effective fuel length. The enrichments (average enrichments on the lateral cross section of the fuel assembly 14B) in the second and third regions are uniformly distributed in the axial direction, respectively.

Among the remaining two-thirds of the fuel assemblies 14 in the central region 11 that were not replaced, one-half are the fuel assemblies 14B that have experienced the operation of nuclear reactor of one fuel cycle, and another one-half are the fuel assemblies 14B that have experienced the operation of nuclear reactor of two fuel cycles.

Figure 5B:
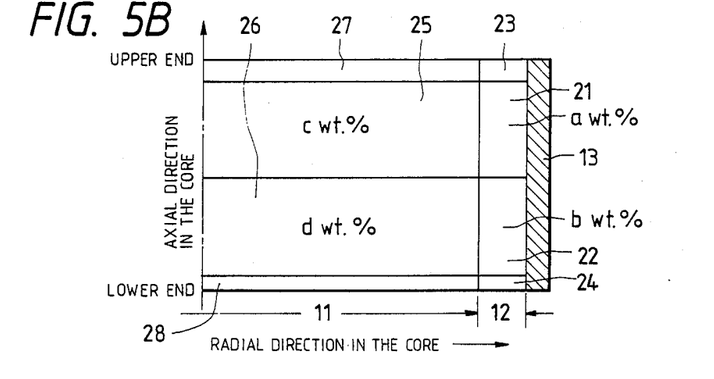
FIG. 5B is a diagram illustrating the enrichment distribution on the vertical cross section of FIG. 5A.

In the core 10 in which new fuel assemblies 14A and 14B are loaded as described above, the average enrichment a (% by weight) in the upper region 21 and the average enrichment b (% by weight) in the lower region 22 of the fuel assembly 14A newly loaded onto the outer region 12 shown in FIG. 5B are each 4.46% by weight, the average enrichment c (% by weight) in the upper region 25 of the fuel assembly 14B newly loaded onto the central region 11 is 4.52% by weight, and the average enrichment d (% by weight) in the lower region 26 thereof is 4.42% by weight. Natural uranium exists at the upper end portions 23 and 27 and at the lower end portions 24 and 28 in the outer region 12 and in the central region 11.

The first region of the fuel assembly 14A loaded onto the outer region 12 corresponds to the lower portion 24, the fifth region corresponds to the upper region 21 and to the lower region 22, and the fourth region corresponds to the upper end 23. Further, the first region of the fuel assembly 14B loaded onto the central region 11 corresponds to the lower end portion 28, the second region corresponds to the lower region 26, the third region corresponds to the upper region 25, and the fourth region corresponds to the upper end portion 27.

According to this embodiment, $a/b$ is 1.00 and $c/d$ is 1.02. Therefore, $a/b < c/d$ holds true. When the nuclear reactor having the core 10 is operated, therefore, the cold shutdown margin can be increased in the outer region 12 of the core 10 in the radial direction since the amount of the fissible material contained in the fuel assembly 14A newly loaded onto the outer region 12 is smaller than the amount of the fissible material contained in the fuel assembly 14B newly loaded onto the central region 11. Furthermore, since the condition $a/b < c/d$ is satisfied, the cold shutdown margin in the outer region 12 is improved, too. With the condition $a/b < c/d$ being satisfied, a sufficiently large thermal margin is obtained in the central region 11. In particular, the thermal margin of the core is greatly improved since the difference ($=0$) between an average enrichment a in the upper region (corresponds to the upper region 21) of the fuel assembly 14A and an average enrichment b in the lower region (corresponds to the lower region 22) of the fuel assembly 14A, is smaller than the difference ($=0.1$) between an average enrichment c in the upper region (corresponds to the upper region 25) of the fuel assembly 14B and an average enrichment d in the lower region (corresponds to the lower region 26) of the fuel assembly 14B, the average enrichment a is greater than the average enrichment b, and the average enrichment c is greater than the average enrichment d.

In the core 10, furthermore, the fuel assemblies 14B have average enrichment that differs depending upon the upper region and the lower region, and the fuel assemblies 14A have average enrichment that is uniformly distributed on the lateral cross section in the axial direction in the region (fifth region) excluding at least the upper end portion and the lower end portion. Therefore, the fuel assemblies 14A can be simply constructed, and the core 10 can be simply constructed, too. In the fuel assemblies 14B, furthermore, the average enrichment on the lateral cross section is uniform in the axial direction in the upper and lower regions. Namely, the fuel assemblies are capable of flattening the power distribution in the axial direction despite their simple construction.

Figure 8:
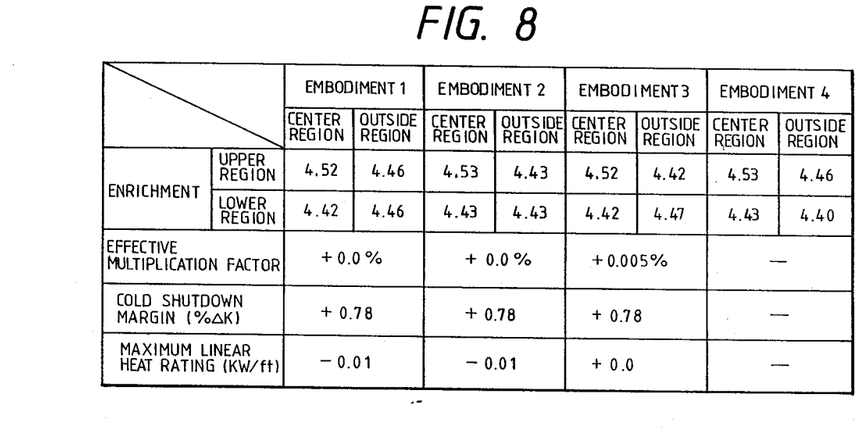
FIG. 8 is a diagram illustrating characteristics of the embodiments 1 to 4 according to the present invention.

Change in the effective multiplication factor, change in the cold shutdown margin and change in the maximum linear heat rating corresponding to the embodiment 1 of FIG. 8 are values during the last period of operation of one fuel cycle in the core 10 of this embodiment. The average enrichment in each of the regions is a value at the start of operation of the fuel cycle. The effective multiplication factor in this embodiment is the same as that of a reference core shown in FIG. 9. The reference core has the characteristics mentioned above in conjunction with FIG. 1, i.e., consists of fuel assemblies each being comprised of natural uranium contained in the first region that extends from the lower end of the effective fuel length to 1/24 of the full length of the effective fuel length, uranium dioxide of 4.42% by weight contained in the second region that extends from the upper end of the first region to 11/24 of the full length of the effective fuel length, uranium dioxide of 4.52% by weight contained in the third region that extends from the upper end of the second region to 22/24 of the full length of the effective fuel length, and natural uranium contained in the fourth region that extends from the upper end of the third region to the upper end of the effective fuel length, the fuel assemblies being loaded onto the central region 11 and the outer region 12.

Figure 9:
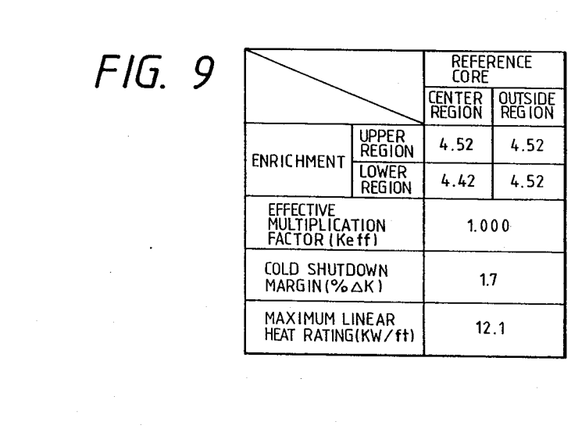
FIG. 9 is a diagram for explaining the characteristics of a reference core.

The cold shutdown margin according to this embodiment is greater than that of the reference core of FIG. 9 by 0.78% Δk. According to this embodiment, furthermore, the maximum linear heat rating is smaller than that of the reference core by 0.01 kw/ft, and the thermal margin decreases correspondingly.

This embodiment can also be adapted to the nuclear reactor in which the fuel assemblies are replaced relying upon the four-batch system.

(Embodiment 2)

Described below is another embodiment of the present invention adapted to the boiling water reactor. Like the core 10 shown in FIG. 5A, the core according to this embodiment is formed by replacing one-third of the fuel assemblies 14 in the outer region 12 by new first fuel assembles having a burn-up of 0 GW d/t and replacing one-third of the fuel assembles 14 in the central region 11 by new second fuel assemblies having a burn-up of 0 GW d/t, at the time of replacing the fuels. What makes this embodiment different from the aforementioned embodiment 1 is that the enrichment distributions of the first and second fuel assemblies in the axial direction are different from those of the fuel assemblies 14A and 14B. The first fuel assembly which constitutes this embodiment comprises first and fourth regions filled with natural uranium, and a fifth region filled with enriched uranium having an enrichment of 4.43% by weight. The constitution of the first fuel assembly is the same as that of the fuel assembly 14A shown in FIG. 6A, except the enrichment distribution. Boundaries of the first, fifth and fourth regions are the same as those of the fuel assembly 14A. Further, the constitution of the second fuel assembly is the same as that of the fuel assembly 14B shown in FIG. 7A, except the enrichment distribution. The second fuel assembly comprises first and fourth regions filled with natural uranium, a second region filled with enriched uranium having an enrichment of 4.43% by weight, and a third region filled with enriched uranium having an enrichment of 4.53% by weight. Boundaries of the first, second, third and fourth regions are the same as those of the fuel assembly 14B. The second fuel assembly has an average enrichment on the lateral cross section that is uniform in the axial direction in both the upper and lower regions.

According to this embodiment, the amount of the fissible material contained in the first fuel assembly newly loaded onto the outer region 12 is smaller than the amount of the fissible material contained in the second fuel assembly newly loaded onto the central region 11. In this embodiment, a/b is 1.00 and c/d is about 1.02, and the condition a/b<c/d is satisfied. Moreover, the difference (=0) between an average enrichment a in the upper region (corresponds to the upper region 21) of the first fuel assembly and an average enrichment b in the lower region (corresponds to the lower region 22) of the first fuel assembly is smaller than the difference (=0.1) between an average enrichment c in the upper region (corresponds to the upper region 25) of the second fuel assembly and an average enrichment d in the lower region (corresponds to the lower region 26) of the second fuel assembly, the average enrichment a is greater than the average enrichment b, and the average enrichment c is greater than the average enrichment d. In the core of this embodiment, furthermore, the second fuel assembly has average enrichment that differs depending upon the upper region and the lower region, and the first fuel assembly has average enrichment on the lateral cross section that is uniformly distributed in the axial direction in the region (fifth region) excluding at least the upper and lower end portions thereof. Therefore, the core of this embodiment exhibits the same effects as those of the core of the embodiment 1.

Change in the effective multiplication factor, change in the cold shutdown margin and change in the maximum linear heat rating corresponding to the embodiment of FIG. 8, are values at the last stage of operation of one fuel cycle in the core of this embodiment. Average enrichment in each of the regions represents a value at the start of operation of the fuel cycle. The effective multiplication factor according to this embodiment is the same as that of the reference reactor shown in FIG. 9. The cold shutdown margin according to this embodiment is greater than that of the reference core of FIG. 9 by 0.78% Δk. Furthermore, the maximum linear heat rating in this embodiment is smaller that that of the reference core by 0.01 kw/ft, and the thermal margin decreases correspondingly.

(Embodiment 3)

Described below is a further embodiment of the present invention adapted to the boiling water reactor. Like the core 10 shown in FIG. 5A, the core according to this embodiment is formed by replacing one-third of the fuel assemblies 14 in the outer region 12 by the new first fuel assemblies having a burn-up to 0 GW d/t and replacing one-third of the fuel assemblies 14 in the central region 11 by the new second fuel assemblies having a burn-up to 0 GW d/t at the time of replacing the fuels. What makes this embodiment different from the aforementioned embodiment 1 is that the first fuel assembly has an enrichment distribution in the axial direction different from that of the fuel assembly 14A. The second fuel assembly is the aforementioned fuel assembly 14B. The first fuel assembly that constitutes this embodiment is comprised of a fuel assembly 14C shown in FIG. 10A. The constitution of the fuel assembly 14C is the same as that of the fuel assembly 14B shown in FIG. 7A except the enrichment distribution. The fuel assembly 14C comprises first and fourth regions filled with natural uranium, a second region filled with enriched uranium having an enrichment of 4.47% by weight, and a third region filled with enriched uranium having an enrichment of 4.42% by weight. Boundaries of these first, second, third and fourth regions are the same as those of the fuel assembly 14B. The fuel assembly 14C has average enrichment on the lateral cross section that is uniform in the axial direction in both the upper and lower regions.

Figure 10A:
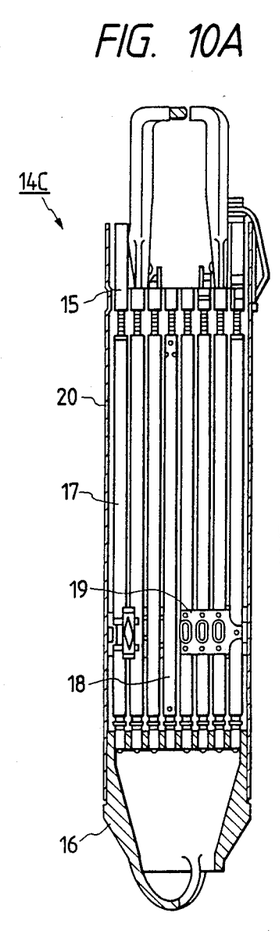
FIG. 10A is a vertical section view of a fuel assembly according to a further embodiment that will be loaded onto the outer region of the core.
Figure 10B:
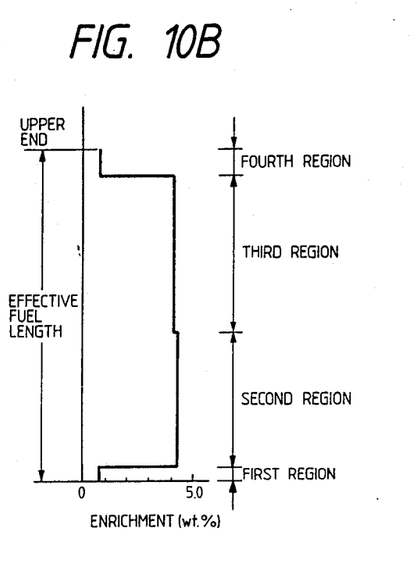
FIG. 10B is a diagram explaining the enrichment distribution in the axial direction of the fuel assembly of FIG. 10A.

According to this embodiment, the amount of the fissible material contained in the fuel assembly 14C newly loaded onto the outer region 12 is smaller than the amount of the fissible material contained in the second fuel assembly newly loaded onto the central region 11. In the core of this embodiment, therefore, the cold shutdown margin can be improved in the outer region 12 in the radial direction. According to this embodiment, furthermore, the ratio a/b of an average enrichment a in the upper region (corresponds to the upper region 21) of the fuel assembly 14C to an average enrichment b in the lower region (corresponds to the lower region 22) of the fuel assembly 14C is 0.99, and the ratio c/d of an average enrichment c in the upper region (corresponds to the upper region 25) of the second fuel assembly to an average enrichment d in the lower region (corresponds to the lower region 26) of the second fuel assembly is about 1.02, to satisfy the condition a/b<c/d. Therefore, the cold shutdown margin is further improved in the outer region 12. With the condition a/b<c/d being satisfied, a sufficiently large thermal margin is obtained in the central region 11.

Change in the effective multiplication factor, change in the cold shutdown margin and change in the maximum linear heat rating corresponding to the embodiment 3 of FIG. 8 are values in the last stage of operation of one fuel cycle in the core of this embodiment. Average enrichment in each of the regions represents a value at the start of operation of the fuel cycle. The effective multiplication factor in this embodiment is slightly greater than that of the reference core of FIG. 9. The cold shutdown margin according to this embodiment is greater than that of the reference core of FIG. 9 by 0.78% Δk. Further, the maximum linear heat rating according to this embodiment is the same as that of the above-mentioned reference core.

(Embodiment 4)

Described below is a still further embodiment of the present invention adapted to the boiling water reactor. Like the core 10 shown in FIG. 5A, the core according to this embodiment is formed by replacing one-third of the fuel assemblies in the outer region 12 by the new third fuel assemblies having a burn-up of 0 GW d/t and replacing one-third of the fuel assemblies 14 in the central region 11 by the new fourth fuel assemblies having a burn-up of 0 GW d/t, at the time of replacing the fuel. What makes this embodiment different from the aforementioned embodiment 2 is that the third fuel assembly has an enrichment distribution in the axial direction that is different from that of the first fuel assembly of the embodiment 2. The fourth fuel assembly is the same as the second fuel assembly in the embodiment 2. The constitution of the third fuel assembly which constitutes this embodiment is the same as that of the fuel assembly 14B shown in FIG. 7A except the enrichment distribution. The third fuel assembly consists of first and fourth regions filled with natural uranium, a second region filled with enriched uranium having an enrichment of 4.40% by weight, and a third region filled with enriched uranium having an enrichment of 4.46% by weight. Boundaries of the first, second, third and forth regions are the same as those of the fuel assembly 14B. The third fuel assembly has average enrichment on the lateral cross section that is uniform in the axial direction in both the upper and lower regions.

According to this embodiment, the amount of the fissible material contained in the first fuel assembly newly loaded onto the outer region 12 is smaller than the amount of the fissible material contained in the second fuel assembly newly loaded onto the central region 11. According to this embodiment, the ratio a/b is about 1.01 and the ratio c/d is about 1.02 to satisfy the condition a/b<c/d. Furthermore, the difference (=0.06) between an average enrichment a in the upper region (corresponds to the upper region 21) of the third fuel assembly and an average enrichment b in the lower region (corresponds to the lower region 22) of the third fuel assembly is smaller than the difference (=0.1) between an average enrichment c in the upper region (corresponds to the upper region 25) of the fourth fuel assembly and an average enrichment d in the lower region (corresponds to the lower region 26) of the fourth fuel assembly, the average enrichment a is greater than the average enrichment b, and the average enrichment c is greater than the average enrichment d. Therefore, the core of this embodiment exhibits the same effects as those of the core of the embodiment 1 except that the core structure becomes more complex than that of the embodiment 1.

The effective multiplication factor, cold shutdown margin and maximum linear heat rating corresponding to the embodiment 2 at the last stage of operation of a fuel cycle in the core of this embodiment are nearly the same as those of the embodiment 1 shown in FIG. 8.

(Embodiment 5)

Described below is a yet further embodiment of the present invention adapted to the boiling water reactor. The core according to this embodiment is an initial core. The fuel assemblies 14 loaded onto the central region 11 of the core 10 shown in FIG. 5A are all the fuel assemblies 14B mentioned in the embodiment 1, and the fuel assemblies 14 loaded onto the outer region 12 are all the fuel assemblies 14A mentioned in the embodiment 1.

In the initial core of this embodiment, therefore, the average enrichment in the outer region 12 becomes smaller than the average enrichment in the central region 11. The cold shutdown margin increases in the outer region 12 in the radial direction of the core. Moreover, the condition a/b<c/d is satisfied wherein a denotes an average enrichment in the upper region 21 of the outer region 12, b denotes an average enrichment in the lower region 22 of the outer region 12, c denotes an average enrichment in the upper region 25 of the central region 11, and d denotes an average enrichment in the lower region 26 of the central region 11. Therefore, the cold shutdown margin is further improved in the outer region 12. With the condition a/b<c/d being satisfied, a sufficiently large thermal margin can be obtained. In particular, the difference between an average enrichment a in the upper region 21 and an average enrichment b in the lower region 22 is smaller than the difference between an average enrichment c in the upper region 25 and an average enrichment d in the lower region 26, the average enrichment a is greater than the average enrichment b, and the average enrichment c is greater than the average enrichment d, contributing to markedly improving the thermal margin of the core.

In the core of this embodiment, furthermore, though the average enrichment varies in the central region 11, the outer region 12 has average enrichment on the lateral cross section that is uniformly distributed in the axial direction in at least the regions (lower region 22 and upper region 21) excluding the upper end portion 23 and the lower end portion 24. Therefore, the constitution of the outer region 12 can be simplified, and the constitution of the initial core of the embodiment can be simplified, too.

In particular, the initial core in which the fuel assemblies are all new has such a small self-controllability that a maximum linear heat rating may increase. The initial core of this embodiment, however, is free from such a probability. That is, the initial core according to this embodiment exhibits a very small maximum linear heat rating and a markedly improved thermal margin.

(Embodiment 6)

Described below is an initial core of a nuclear reactor according to another embodiment of the present invention adapted to the boiling water reactor. In the initial core of this embodiment, the fuel assemblies 14 loaded onto the central region 11 of the core 10 shown in FIG. 5A are all the second fuel assemblies mentioned in the embodiment 2, and the fuel assemblies 14 loaded onto the outer region 12 are all the first fuel assemblies mentioned in the embodiment 2.

In the initial core of this embodiment, therefore, the average enrichment in the outer region 12 becomes smaller than the average enrichment in the central region 11 to satisfy the condition $a/b<c/d$ mentioned in the embodiment 5. Furthermore, the difference between an average enrichment a in the upper region 21 and an average enrichment b in the lower region 22 is smaller than the difference between an average enrichment c in the upper region 25 and an average enrichment d in the lower region 26, the average enrichment a is greater than the average enrichment b, and the average enrichment c is greater than the average enrichment d. In the core of this embodiment, furthermore, the average concentration differs in the central region 11 but the outer region 12 has an average enrichment on the lateral cross sections that is uniformly distributed in the axial direction in at least the regions (lower region 22 and upper region 21) excluding the upper end portion 23 and the lower end portion 24. Therefore, the initial core according to this embodiment exhibits the same effects as those of the embodiment 5.

(Embodiment 7)

Described below is an initial core of a nuclear reactor according to a further embodiment of the present invention adapted to the boiling water reactor. In the initial core of this embodiment, the fuel assemblies 14 loaded onto the central region 11 of the core 10 shown in FIG. 5A are all the second fuel assemblies mentioned in the embodiment 3, and the fuel assemblies 14 loaded onto the outer regions 12 are all the first fuel assemblies mentioned in the embodiment 3.

In the initial core of this embodiment, therefore, the average enrichment in the outer region 12 is smaller than the average enrichment in the central region 11, making it possible to improve the cold shutdown margin in the outer region 12 in the axial direction of the core. Moreover, the condition $a/b<c/d$ is satisfied wherein a denotes an average enrichment in the upper region 21 of the outer region 12, b denotes an average enrichment in the lower region 22 of the outer region 12, c denotes an average enrichment in the upper region 25 of the central region 11, and d denotes an average enrichment in the lower region 26 of the central region 11, and whereby the cold shutdown margin is further improved in the outer region 12. With the condition $a/b<c/d$ being satisfied, a sufficiently large thermal margin is obtained in the central region 11.

(Embodiment 8)

Described below is an initial core of a nuclear reactor according to still further embodiment of the present invention adapted to the boiling water reactor. In the initial core of this embodiment, the fuel assemblies 14 loaded onto the central region 11 of the core 10 shown in FIG. 5A are all the fourth fuel assemblies mentioned in the embodiment 4, and the fuel assemblies 14 loaded onto the outer region 12 are all the third fuel assemblies mentioned in the embodiment 4.

In the initial core of this embodiment, therefore, the average enrichment in the outer region 12 becomes smaller than the average enrichment in the central region 11 to satisfy the condition $a/b<c/d$ mentioned in the embodiment 5. Furthermore, the difference between an average enrichment a in the upper region 21 and an average enrichment b in the lower region 22 is smaller than the difference between an average enrichment c in the upper region 25 and an average enrichment d in the lower region 26, the average enrichment a is greater than the average enrichment b, and the average enrichment c is greater than the average enrichment d. In the core of this embodiment, the average enrichment varies in the central region 11 but the outer region 12 has average enrichment on the lateral cross section that is uniformly distributed in the axial direction in at least the region (lower region 22 and upper region 21) including the upper end portion 23 and the lower end portion 24. Therefore, the initial core of this embodiment exhibits the same effects as those of the embodiment 5.

The new fuel assemblies having a burn-up of 0 GW d/t loaded onto the core in the aforementioned embodiments 1 to 4, are capable of offering a burn-up of about 45 GW d/t.

What is claimed is:

1. In a reactor core in a nuclear reactor loaded with a plurality of fuel assemblies, the improvement wherein a region in the radial direction of said core is divided into a central region and an outer region in said radial direction except the outermost circumferential region occupied by fuel assemblies arranged along the outermost circumference which forms part of the region in the radial direction of said core, amounts of a fissible material contained in each of first fresh unirradiated fuel assemblies that are newly loaded onto said outer region are smaller than amounts of the fissible material contained in each of second fresh unirradiated fuel assemblies that are newly loaded onto said central region, and a relationship $a/b<c/d$ is satisfied, wherein a denotes the amount of said fissible material in the upper region of each of said first fuel assemblies, b denotes the amount of the fissible material in the lower region of each of said first fuel assemblies, c denotes the amount of the fissible material in the upper region of each of said second fuel assemblies, and d denotes the amount of the fissible material in the lower region of each of said second fuel assemblies.

2. A reactor core in a nuclear reactor according to claim 1, wherein an average enrichment of said first fuel assemblies is smaller than that of said second fuel assemblies, and a relationship $a/b<c/d$ is satisfied, wherein a denotes an average enrichment in the upper region of said first fuel assemblies, b denotes an average enrichment in the lower region of said first fuel assemblies, c denotes an average enrichment in the upper region of said second fuel assemblies, and d denotes an average enrichment in the lower region of said second fuel assemblies.

3. A reactor core in a nuclear reactor according to claim 2 wherein an average enrichment on the lateral cross section in the upper portions of said first and second fuel assemblies is uniform in the axial direction thereof except the upper end portions of said upper regions, and an average enrichment on the lateral cross section in the lower portions of said first and second fuel assemblies is uniform in the axial direction thereof except the lower end portions of said lower regions.

4. A reactor core in a nuclear reactor according to claim 1, wherein the nuclear reactor is a boiling water reactor.

5. A reactor core in a nuclear reactor according to claim 1, wherein a level of a boundary between the upper region and the lower region in said first fuel assemblies and a level of a boundary between the upper region and the lower region in said second fuel assemblies are at substantially the same level.

6. In a reactor core in a nuclear reactor loaded with a plurality of fuel assemblies, the improvement wherein a region in the radial direction of the core is divided into a central region and an outer region in said radial direction except the outermost circumferential region occupied by fuel assemblies along the outermost circumference which forms part of the region in the radial direction of said core, amounts of a fissible material contained in each of first fresh unirradiated fuel assemblies that are newly loaded onto said outer region are smaller than amounts of the fissible material contained in each of second fresh unirradiated fuel assemblies that are newly loaded onto said central region, a difference between an amount a of said fissible material in the upper regions of each of said first fuel assemblies and an amount b of the fissible material in the lower region of each of said first fuel assemblies is smaller than a difference between an amount c of said fissible material in the upper region of each of said second fuel assemblies and an amount d of said fissible material in the lower region of each of said second fuel assemblies, the amount a of said fissible material is greater than the amount b of said fissible material, and the amount c of said fissible material is greater than the amount d of said fissible material.

7. A reactor core in a nuclear reactor according to claim 6, wherein an average enrichment of said first fuel assemblies is smaller than that of said second fuel assemblies, a difference between an average enrichment a in the upper region of said first fuel assemblies and an average enrichment b in the lower region of said first fuel assemblies is smaller than a difference between an average enrichment c in the upper region of said second fuel assemblies and an average enrichment d in the lower region of said second fuel assemblies, said average enrichment a is greater than said average enrichment b, and said average enrichment c is greater than said average enrichment d.

8. A reactor core in a nuclear reactor according to claim 7, wherein an average enrichment on the lateral cross section in the upper portions of said first and second fuel assemblies is uniform in the radial direction thereof except the upper end portion of said upper regions, and an average enrichment on the lateral cross section in the lower portions of said first and second fuel assemblies is uniform in the axial direction thereof except the lower end portions of said lower regions.

9. A reactor core in a nuclear reactor according to claim 6, wherein the nuclear reactor is a boiling water reactor.

10. A reactor core in a nuclear reactor according to claim 6, wherein a level of a boundary between the upper region and the lower region in said first fuel assemblies and a level of a boundary between the upper region and the lower region in said second fuel assemblies are at substantially the same level.

11. In a reactor core in a nuclear reactor loaded with a plurality of fuel assemblies, the improvement wherein a region in the radial direction of the core is divided into a central region and an outer region in said radial direction except the outermost circumferential region occupied by fuel assemblies arranged along the outermost circumference which forms part of the region in the radial direction of the core, amounts of a fissible material contained in each of first fresh unirradiated fuel assemblies that are newly loaded onto said outer region are smaller than amounts of the fissible material contained in each of second fresh unirradiated fuel assemblies that are newly loaded onto said central region, the amount of said fissible material of each of said first fuel assemblies is uniformly distributed in the axial direction in at least the regions that excludes the upper end portion and the lower end portion thereof, and the amount c of said fissible material in the upper regions of each of said second fuel assemblies is greater than the amount d of said fissible material in the lower regions of each of said second fuel assemblies.

12. A reactor core in a nuclear reactor according to claim 11, wherein an average enrichment of said first fuel assemblies is smaller than that of said second fuel assemblies, the average enrichment on the lateral cross section of said first fuel assemblies is uniformly distributed in the axial direction in at least the regions excluding the upper end portion and the lower end portion thereof, and the average enrichment c in the upper regions of said second fuel assemblies is greater than the average enrichment d in the lower regions of said second fuel assemblies.

13. A reactor core in a nuclear reactor according to claim 12, wherein an average enrichment on the lateral cross section in the upper regions of said second fuel assemblies is uniform in the axial direction thereof except the upper end portions of said upper regions, and an average enrichment on the lateral cross section in the lower regions of said second fuel assemblies is uniform in the axial direction thereof except the lower end portions of said lower regions.

14. A reactor core in a nuclear reactor according to claim 11, wherein the nuclear reactor is a boiling water reactor.

15. A reactor core in a nuclear reactor according to claim 11, wherein a level of a boundary between the upper region and the lower region in said second fuel assemblies is about the center of said second fuel assembly in the axial direction.

16. In an initial starting core in a nuclear reactor loaded with a plurality of fresh unirradiated fuel assemblies, the improvement wherein a region in the radial direction of the core is divided into a central region and an outer region in said radial direction except the outermost circumferential region occupied by unirradiated fuel assemblies arranged along the outermost circumference which forms part of the region in the radial direction of the core, an average enrichment in said outer region is smaller than an average enrichment in said central region, a difference between an average enrichment a in the upper region of said outer region and an average enrichment b in the lower region of said outer region is smaller than a difference between an average enrichment c in the upper region of said central region and an average enrichment d in the lower region of said central region, said average enrichment a is greater than said average enrichment b, and said average enrichment c is greater than said average enrichment d.

17. An initial core in a nuclear reactor according to claim 16, wherein an average enrichment on the lateral cross section in said outer region and said central region is uniform in the axial direction of the regions excluding the upper end portions of said upper regions, and an average enrichment on the lateral cross section in the lower regions of said outer region and said central region is uniform in the axial direction of the regions excluding the lower end portions of said lower regions.

18. An initial starting core in a nuclear reactor according to claim 16, wherein the nuclear reactor is a boiling water reactor.

19. An initial starting core in a nuclear reactor according to claim 16, wherein a level of a boundary between the upper region and the lower region in said central region and a level of a boundary between the upper region and the lower region in said outer region are at substantially the same level.

20. In an initial starting core in a nuclear reactor loaded with a plurality of fresh unirradiated fuel assemblies, the improvement wherein a region in the radial direction of the core is divided into a central region and an outer region in said radial direction except the outermost circumferential region occupied by unirradiated fuel assemblies arranged along the outermost circumference which forms part of the region in the radial direction of the core, an average enrichment in said outer region is smaller than an average enrichment in said central region, an average enrichment on the lateral cross section in said outer region is uniformly distributed in the axial direction in at least the regions excluding the upper end portion and the lower end portion thereof, and an average enrichment c in the upper region of said central region is greater than an average enrichment d in the lower region of said central region.

21. An initial core in a nuclear reactor according to claim 20, wherein an average enrichment on the lateral cross section in the upper region of said central region is uniform in the axial direction of the regions excluding the upper end portions of said upper regions, and an average enrichment on the lateral cross section in the lower region of said central region is uniform in the axial direction of the region excluding the lower end portion of said lower region.

22. An initial starting core in a nuclear reactor according to claim 20, wherein the nuclear reactor is a boiling water reactor.

23. An initial starting core in a nuclear reactor according to claim 20, wherein a level of a boundary between the upper region and the lower region in said central region and a level of a boundary between the upper region and the lower region in said outer region are at substantially the same level.

* * * * *